(12) United States Patent
Mitter (10) Patent No.: US 11,262,477 B2
(45) Date of Patent: Mar. 1, 2022

(54) METHOD FOR OPERATING A SENSOR ASSEMBLY AND SENSOR ASSEMBLY SUITABLE THEREFOR

(71) Applicant: E+E Elektronik Ges.m.b.H., Engerwitzdorf (AT)

(72) Inventor: Helmut Mitter, Hellmonsoedt (AT)

(73) Assignee: E+E ELEKTRONIK GES.M.B.H., Engerwitzdorf (AT)

( * ) Notice: Subject to any disclaimer, the term of this patent is extended or adjusted under 35 U.S.C. 154(b) by 717 days.

(21) Appl. No.: 16/000,894

(22) Filed: Jun. 6, 2018

(65) Prior Publication Data

US 2018/0364392 A1 Dec. 20, 2018

(30) Foreign Application Priority Data

Jun. 14, 2017 (DE) ...................... 10 2017 210 064.8

(51) Int. Cl.
*G01W 1/08* (2006.01)
*G01N 25/56* (2006.01)
(Continued)

(52) U.S. Cl.
CPC .............. *G01W 1/08* (2013.01); *G01N 25/56* (2013.01); *G01N 27/223* (2013.01); *G01W 1/02* (2013.01)

(58) Field of Classification Search
CPC ........ G01W 1/08; G01W 1/02; G01N 27/223; G01N 25/56; G01D 21/02
(Continued)

(56) References Cited

U.S. PATENT DOCUMENTS 3,499,717 A * 3/1970 Well .................. F23J 15/08
431/2
3,596,264 A * 7/1971 Ciemochowski ...... G08B 19/02
340/870.16
(Continued)

FOREIGN PATENT DOCUMENTS

CN 2927046 Y 7/2007
CN 105806900 A 7/2016
(Continued)

OTHER PUBLICATIONS

Lasse Makkonen et al: "Humidity Measurements in Cold and Humid Environments", Boundary-Layer Meterology, Kluwer Academic Publishers, DO, vol. 116, No. 1, Jul. 1, 2005 (Jul. 1, 2005), pp. 131-147, XP019232845.
(Continued)

*Primary Examiner* — Marrit Eyassu
(74) *Attorney, Agent, or Firm* — Leydig, Voit & Mayer Ltd.

(57) ABSTRACT

A method is useable for operating a sensor assembly for determining relative humidity in radiosondes. The sensor assembly includes a humidity sensor, a temperature sensor and a heating element. It is determined whether humidity is at or above a predetermined humidity limit selected as the limiting humidity with respect to saturation over ice. The humidity sensor is heated, at least temporarily, wherein in a temperature range below 0° C., the humidity sensor is at least temporarily heated by the heating element based on it having been determined that the humidity is at or above the predetermined humidity limit.

14 Claims, 7 Drawing Sheets

(51) Int. Cl.
*G01W 1/02* (2006.01)
*G01N 27/22* (2006.01)

(58) Field of Classification Search
USPC ........................................................ 73/29.01
See application file for complete search history.

(56) References Cited

U.S. PATENT DOCUMENTS

| | | | |
|---|---|---|---|
| 4,893,508 A * | 1/1990 | Friedman | G01N 25/56 |
| | | | 333/35 |
| 5,814,726 A | 9/1998 | Mitter | |
| 10,330,083 B2 * | 6/2019 | Hilling | F03D 1/0675 |
| 2005/0028588 A1 * | 2/2005 | Mitter | G01N 27/223 |
| | | | 73/335.04 |
| 2016/0003975 A1 | 1/2016 | Salo et al. | |
| 2016/0053747 A1 * | 2/2016 | Olesen | F03D 17/00 |
| | | | 219/553 |

FOREIGN PATENT DOCUMENTS

| | | | |
|---|---|---|---|
| CN | 106164657 A | | 11/2016 |
| CN | 106291763 A | | 1/2017 |
| CN | 106501877 A | | 3/2017 |
| DE | 2619600 A | * | 5/1976 |
| DE | 2851686 A1 | | 6/1979 |
| EP | 0640831 A2 | | 3/1995 |
| EP | 0645620 A2 | | 3/1995 |
| EP | 0801302 A1 | | 10/1997 |
| EP | 1505387 A1 | | 2/2005 |
| GB | 1186783 A | * | 4/1967 |
| GB | 1186783 A | | 4/1970 |
| GB | 2047431 A | | 11/1980 |
| GB | 2241787 A | | 9/1991 |
| JP | 2014231937 A | | 12/2014 |
| WO | WO 2014128348 A1 | | 8/2014 |

OTHER PUBLICATIONS

E+e Elektronik GmbH: "HMC03M—Heated Humidity Sensor for Radiosondes and Weather Balloons", Apr. 13, 2017 (Apr. 13, 2017), pp. 1-2, XP055517336.

World Meteorological Organization (wmo): "Guide to meterological instruments and methods of observation. Chapter 4. Measurement of humidity. WM0—No. 8 (CIMO Guide)", Jan. 1, 2014 (Jan. 1, 2014), pp. 127-165, XP055517506.

* cited by examiner

PRIOR ART

METHOD FOR OPERATING A SENSOR ASSEMBLY AND SENSOR ASSEMBLY SUITABLE THEREFOR

CROSS-REFERENCE TO PRIOR APPLICATION

Priority is claimed to German Patent Application No. DE 10 2017 210 064.8, filed on Jun. 14, 2017, the entire disclosure of which is hereby incorporated by reference herein.

FIELD

The present invention relates to a method for operating a sensor assembly and a sensor assembly suitable therefor. The method and sensor assembly according to the present invention are suitable in particular for humidity measurements in radiosondes.

BACKGROUND

EP 0 801 302 A1 describes a method and a device of the aforementioned type for measuring humidity. The device includes a humidity sensor, a temperature sensor as well as a heating element. In order to prevent false readings in particular in the high-humidity range, this publication proposes that the humidity sensor be heated; i.e., operated at increased temperature, when a predetermined humidity limit is reached.

While this procedure provides a satisfactory solution for normal humidity measurements, certain problems arise when using such devices in radiosondes.

Such radiosondes are typically made up of a balloon filled with helium or hydrogen, to which is attached a GPS unit as well as a sensor assembly for measuring different climate parameters. The sensor assembly may be used to determine, for example, the temperature and relative humidity of the atmospheric regions through which the balloon flies. The sensor assembly is suspended below the balloon at a sufficient distance to prevent measurements from potentially being influenced by the balloon. During ascent, the measurement data generated by the sensor assembly with respect to temperature, relative humidity and the sonde's position is continuously transmitted to a ground station, so that a vertical profile of the relative humidity, temperature, wind velocity and wind direction can be created after suitable analysis of the measurement data. The maximum ascent height of such radiosondes may be over 30 km; typical ascent heights are in the range between 15 km and 20 km.

In particular when measuring humidity, problems arise in such radiosondes when they flow through air layers of very different temperature and humidity conditions. In tropical regions, for example, temperatures of 30° C. and relative humidities of up to 95% RH may prevail, while in high atmospheric layers, temperatures down to −80° C. and virtually no water content are present.

One of the greatest known causes of errors in radiosondes is the potential for condensation and resulting icing of the sensors in the sensor assembly. In the case of humidity measurement, an icing event typically results in erroneous measurements. Such icing may remain for a longer period of time, even after leaving the respective air layers. Thus, a failure and resulting false readings may persist even over a longer period of time.

Besides various other approaches, heating of the sensor system for measuring humidity is one option to prevent icing and associated false readings.

WO 2014/128348 A1, for example, proposes to continuously heat the sensor system for measuring humidity in order to prevent icing. However, permanent heating reduces the sensitivity of the humidity sensor system and thus its measurement accuracy. Moreover, permanent heating results in increased energy requirements, which is problematic because the radiosonde is battery-powered.

The heating method described in the publication EP 0 801 302 A1 mentioned at the outset is also not capable of reliably preventing icing of the humidity sensor system, especially at very low temperatures. This is because at such temperatures, the humidity limit of about 75% according to the so-called WMO definition (World Metrological Organization) at and above which heating is to be provided, is not reached. Typically, the system ices up earlier.

SUMMARY

In an embodiment, the present invention provides a method for operating a sensor assembly for determining relative humidity in radiosondes. The sensor assembly includes a humidity sensor, a temperature sensor and a heating element. It is determined whether humidity is at or above a predetermined humidity limit selected as the limiting humidity with respect to saturation over ice. The humidity sensor is heated, at least temporarily, wherein in a temperature range below 0° C., the humidity sensor is at least temporarily heated by the heating element based on it having been determined that the humidity is at or above the predetermined humidity limit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5b is a plan view of the portion of the sensor assembly shown in FIG. 5a;

FIG. 6b is a plan view of the portion of the sensor assembly shown in FIG. 6a;

FIG. 7b is a plan view of the portion of the sensor assembly shown in FIG. 7a;

DETAILED DESCRIPTION

Embodiments of the present invention provide a method for operating a sensor assembly as well as a corresponding sensor assembly for measuring humidity whereby erroneous measurements due to icing can be prevented, even in low temperatures.

The method according to an embodiment of the present invention serves for operating a sensor assembly, and in particular for determining the relative humidity in radiosondes. The sensor assembly includes a humidity sensor, a temperature sensor as well as a heating element, the humidity sensor being heated, at least temporarily. In the temperature range below 0° C., the humidity sensor is at least temporarily heated by the heating element when the humidity is at or above a predetermined humidity limit, the humidity limit being selected as the limiting humidity with respect to saturation over ice.

In the temperature range below 0° C., the humidity limit is here selected according to the standard definition of relative humidity as a constant humidity limit, the relative humidity being derived as $$U_i = \frac{e}{e_i(t)} \cdot 100 = U_w \cdot \frac{e_w(t)}{e_i(t)}$$

where:
$U_i$:=relative humidity according to the standard definition over ice
e:=actual water vapor partial pressure
$e_i(t)$:=water vapor partial pressure at saturation over an ice surface
$U_w$:=relative humidity according to the WMO definition over water
$e_w(t)$:=water vapor partial pressure at saturation over a water surface It is possible to select the humidity limit in the range $60\% \leq U_{i,limit} \leq 90\%$.

In an advantageous variant, the humidity limit is selected as $U_{i,limit}=75\%$.

Furthermore, it may be provided that, in a predetermined range between a first humidity limit and a second humidity limit, the humidity sensor be heated by the heating element with a constant heating power, the humidity limits being selected as limiting humidities with respect to saturation over ice.

The first humidity limit may be selected in the range $85\% \leq U_{i,limit\_1} \leq 95\%$ and the second humidity limit may be selected in the range $65\% \leq U_{i,limit\_2} \leq 75\%$.

Alternatively, it may be provided that when the humidity limit is reached or exceeded, the humidity sensor be heated by the heating element in a controlled manner that will result in a constant relative humidity of the humidity sensor.

In this connection, the local temperature of the humidity sensor may be controlled so as to obtain a constant relative humidity as high as the humidity limit.

Moreover, in the temperature range above 0° C., the humidity sensor may at least temporarily be heated by the heating element when the humidity is at or above a predetermined humidity limit, the humidity limit being selected as the limiting humidity with respect to saturation over water.

The sensor assembly according to an embodiment of the present invention is suitable, in particular, for determining the relative humidity in radiosondes. It includes a humidity sensor, a temperature sensor as well as a heating element, the humidity sensor being at least temporarily heatable via a control unit acting upon the heating element. The control unit is adapted to at least temporarily heat the humidity sensor via the heating element in the temperature range below 0° C. when the humidity is at or above a predetermined humidity limit, the humidity limit being selected as the limiting humidity with respect to saturation over ice.

The humidity sensor may be configured as a parallel-plate capacitor including two electrodes and a humidity-sensitive polymer disposed therebetween, one of the electrodes being permeable to humidity.

Furthermore, the temperature sensor and the heating element may be configured as a combined unit, the measurement current being variable via the control unit for purposes of heating the humidity sensor.

To this end, the humidity sensor may be disposed on one side of a sensor substrate and the combined unit including the temperature sensor and the heating element may be disposed adjacent thereto.

Alternatively, the humidity sensor may be disposed on one side of a sensor substrate and the heating element may be disposed adjacent thereto, while the temperature sensor may be disposed on the opposite side of the sensor substrate, the temperature sensor being configured as an NTC element and attached to the sensor substrate by a thermally conductive adhesive.

Moreover, the humidity sensor, the temperature sensor as well as the heating element may be deposited on a sensor substrate of silicon using thin-film technology, the sensor substrate being provided with an insulation layer.

Through the measures according to embodiments of the present invention, icing of the humidity sensor can be reliably prevented even at low temperatures. At the same time, unlike in the known method mentioned above, there is no need for permanent heating, which would be associated with significantly increased energy requirements. Moreover, heating as needed ensures the least possible influence on the humidity measurement. Thus, the method and sensor assembly according to embodiments of the present invention are suitable in particular for use in radiosondes.

Figure 1:
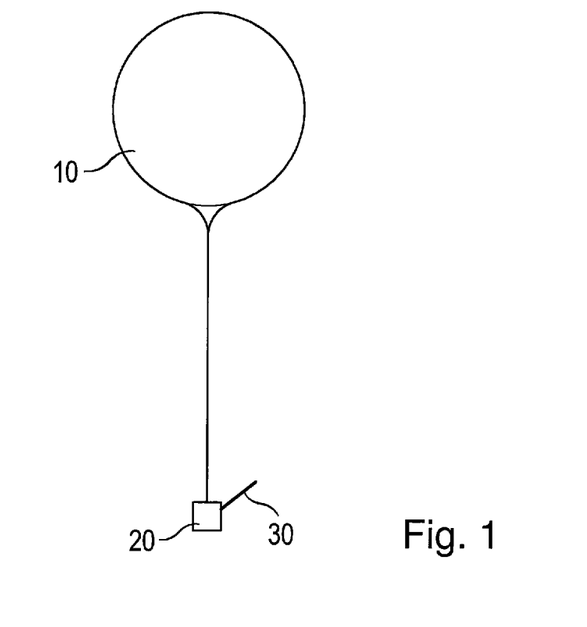
FIG. 1 is a schematic view of a radiosonde.
Figure 2:
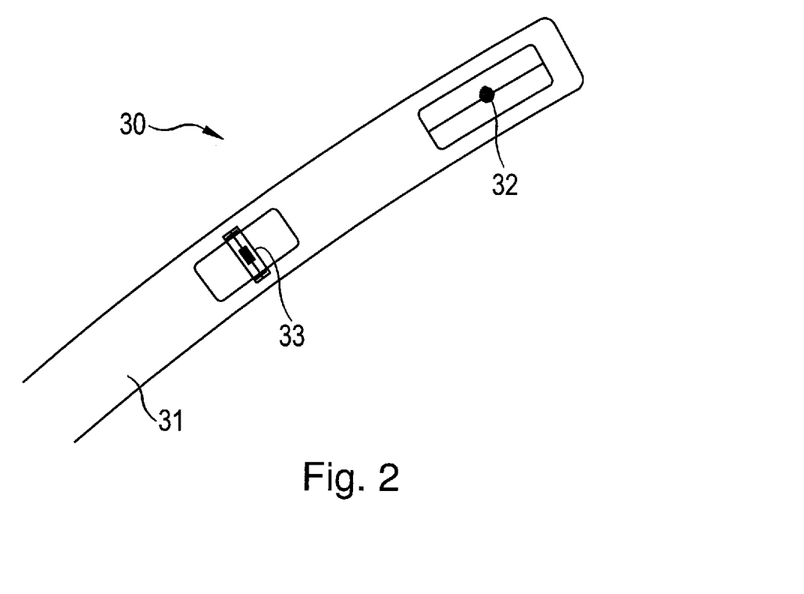
FIG. 2 is an enlarged view of the sensor unit of the radiosonde shown in FIG. 1.
Figure 3:
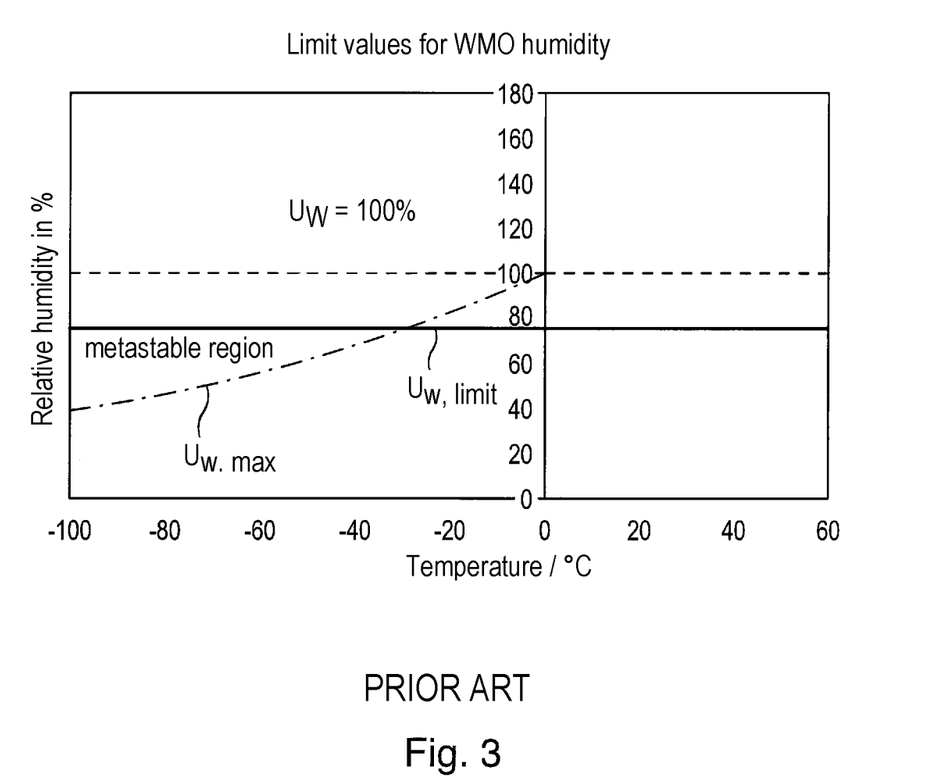
FIG. 3 is a diagram illustrating the relationships between temperature and relative humidity for a sensor assembly heated in accordance with the prior art.
Figure 4A:
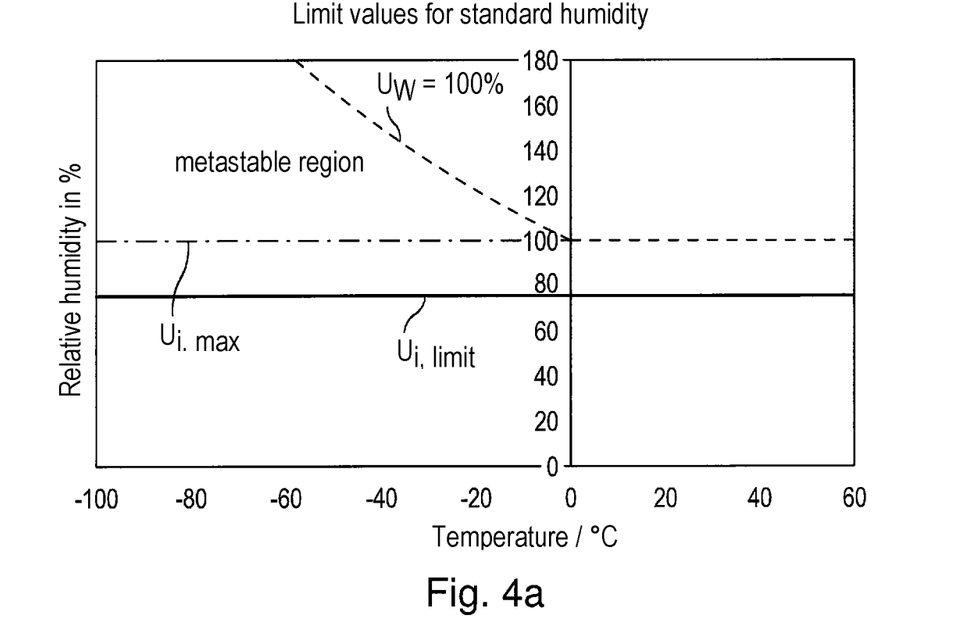
FIG. 4a is a first diagram illustrating the relationships between temperature and relative humidity for a sensor assembly heated in accordance with an embodiment of the present invention.
Figure 4B:
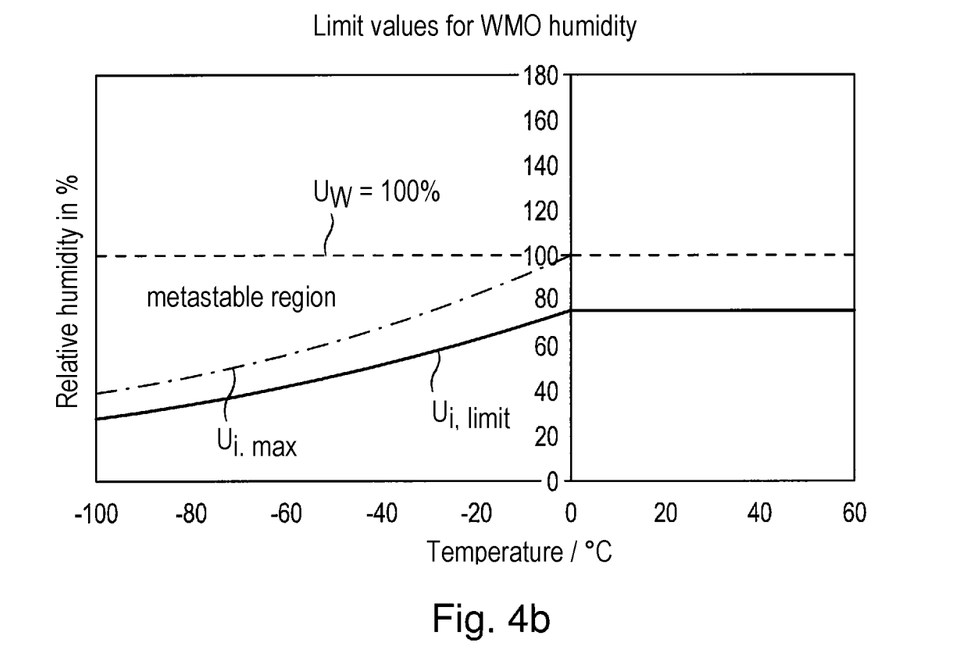
FIG. 4b is a second diagram illustrating the relationships between temperature and relative humidity for a sensor assembly heated in accordance with an embodiment of the present invention.

Before describing the method according to an embodiment of the present invention in detail with reference to FIGS. 3, 4a and 4b, first the primary field of application of the embodiment and the basic design of a radiosonde with the sensor assembly according to an embodiment of the present invention will be illustrated with the aid of FIGS. 1 and 2.

FIG. 1 shows in highly schematic form a radiosonde made up of a balloon 10 filled with helium or hydrogen from which is suspended an electronics unit 20 containing a sensor unit 30. Electronics unit 20 includes various components. These include, inter alia, a GPS unit for position determination, a transmitter module for transmitting data to a ground station, batteries for power supply, as well as a control unit. The control unit may process the data acquired via the sensor assembly before it is transmitted to a ground station. Moreover, the heating of parts of a sensor assembly forming part of sensor unit 30, which heating will be described hereinafter in detail, is also performed via the control unit.

In FIG. 2, sensor unit 30 is shown schematically in enlarged view. As can be seen from the figure, sensor unit 30 includes a plurality of measuring components disposed on a carrier 31, namely a gas temperature sensor 32 for measuring the ambient air temperature $t_{gas}$ as well as a sensor assembly 33 for measuring the ambient humidity. The sensor assembly 33 includes individual components. Sensor assembly 33 essentially includes a humidity sensor, a temperature sensor for measuring the sensor assembly temperature, as well as a heating element via which the humidity sensor is at least temporarily heated to prevent icing. The components of sensor assembly 33 are typically disposed on a suitable sensor substrate. For further details pertaining to sensor assembly 33, reference is made to the following description of exemplary embodiments, which follows the description of the method according to embodiments of the present invention.

The method according to an embodiment of the present invention will be described hereafter with the aid of FIGS. 3, 4a and 4b. First, some relationships in connection with different definitions of relative humidity will be explained.

In thermodynamics, for example, the relative humidity $U_w$ of a gas is usually defined as the ratio of the actual water vapor partial pressure e in the gas to the water vapor partial pressure at saturation (saturation water vapor partial pressure) $e_w(t)$ at the gas temperature t, expressed in %:

$$U_w = \frac{e}{e_w(t)} \cdot 100\% \qquad \text{(equation 1)}$$

where:
$U_w$:=relative humidity
e:=actual water vapor partial pressure
$e_w(t)$:=saturation water vapor partial pressure over water at temperature t In the temperature range of t>0° C., only one single definition of relative humidity $U_w$ exists according to the above equation 1, because there is only one single saturation state or saturation water vapor partial pressure $e_w(t)$ at saturation over water.

This is different in the negative temperature range t<0° C.; i.e., in the temperature range in which the above-discussed icing problems can occur in radiosondes. Here, two different definitions exist for relative humidity because of the different water vapor partial pressures at saturation over water, ew(t), and at saturation over ice, $e_i(t)$.

Firstly, there is the so-called "WMO definition" (WMO: World Metrological Organization) of relative humidity, which is of interest in particular for thermodynamic considerations. This definition is derived according to the following relationship and is identical to the preceding equation 1:

$$U_w = \frac{e}{e_w(t)} \cdot 100\%$$

where:
$U_w$:=relative humidity according to the WMO definition
e:=actual water vapor partial pressure
$e_w(t)$:=saturation water vapor partial pressure over water at temperature t Thus, the WMO definition of relative humidity is valid in the entire temperature range; i.e., both at positive and negative temperatures t. The WMO definition of relative humidity is primarily used in meteorology.

Besides this definition of relative humidity, there is also the so-called "standard definition" of relative humidity for negative temperatures t<0° C., which is sometimes also called "technical definition" of relative humidity. While, as mentioned above, in the temperature range t>0° C., the standard definition of relative humidity is identical to the WMO definition of relative humidity, the relative humidity according to the standard definition in the negative temperature range t<0° C. is derived as $$U_i = \frac{e}{e_i(t)} \cdot 100\% \qquad \text{(equation 2)}$$

where:
$U_i$:=relative humidity according to the standard definition
e:=actual water vapor partial pressure
$e_i(t)$:=saturation water vapor partial pressure over ice at temperature t Thus, in the temperature range t<0° C., the following also holds:

$$U_i = U_w \cdot \frac{e_w(t)}{e_i(t)} \qquad \text{(equation 3)}$$

where:
$U_i$:=relative humidity according to the standard definition
$U_w$:=relative humidity according to the WMO definition
$e_w(t)$:=saturation water vapor partial pressure over water at temperature t
$e_i(t)$:=saturation water vapor partial pressure over ice at temperature t The background of the two different definitions of relative humidity is that in technical environments, the saturation state over ice is never exceeded. Here, the ice saturation represents the maximum value, so that the resulting relative humidity according to the standard definition is usually in the range of 0-100%.

When measuring the relative humidity according to the WMO definition in technical environments using the ice saturation as the maximum possible value, then, at negative temperatures t<0° C., there is a maximum relative humidity $U_{w.max}$ which is derived from the ratio of the saturation water vapor partial pressures over ice and water as follows:

$$U_{w.max} = \frac{e_i(t)}{e_w(t)} \cdot 100 \qquad \text{(equation 4)}$$

where:
$U_{w.max}$:=maximum relative humidity according to the WMO definition in the case of icing
$e_i(t)$:=saturation water vapor partial pressure over ice at temperature t
$e_w(t)$:=saturation water vapor partial pressure over water at temperature t In the following table, the maximum relative humidity $U_{w.max}$ in the case of icing as determined according to the WMO definition is compiled by way of for a few negative temperatures t<0° C.:

| t [° C.] | 0 | −10 | −20 | −30 | −40 | −50 | −60 | −70 | −80 |
|---|---|---|---|---|---|---|---|---|---|
| $e_w(t)$ [hPa] | 6.1357 | 2.8766 | 1.2611 | 0.5126 | 0.1912 | 0.0647 | 0.0196 | 0.0052 | 0.0012 |
| $e_i(t)$ [hPa] | 6.1356 | 2.6094 | 1.0368 | 0.3817 | 0.1290 | 0.0396 | 0.0109 | 0.0026 | 0.0005 |
| $U_{w.max}$ [%] | 100.00 | 90.71 | 82.21 | 74.47 | 67.46 | 61.14 | 55.48 | 50.44 | 45.98 |

It can be seen from this table that in technical systems at a temperature of t=−40° C., for example, the maximum relative humidity as determined according to the WMO definition is $U_{w.max}$=67.46%, whereas the relative humidity $U_i$ according to the standard definition is $U_i$=100%.

It can also be seen from this table that at negative temperatures t below about −30° C., a maximum relative humidity $U_{w.max}$ of about 75% according to the WMO definition is not exceeded anymore. In the case of a temporary heating of the humidity sensor in a sensor assembly according to the above-discussed EP 0 801 302 A1, this has the effect that the humidity limit of 75%, at which the heating operation is to commence, is not reached, and therefore the sensor assembly ices up, resulting in the undesired consequences associated therewith.

For a heating method according to EP 0 801 302 A1, this relationship is also apparent from the diagram of FIG. 3. In this diagram, different humidity limits according to the WMO definition are plotted as a function of temperature t. For example, the solid-line curve represents the humidity limit $U_{w,limit}$ at and above which the humidity sensor is heated. The dash-dot curve illustrates the humidity limit $U_{w.max}$ at and above which icing occurs below 0° C. The broken-line curve indicates the humidity limit $U_w$=100% for the thermodynamically maximum water content, which here is 100% in the entire temperature range. Thus, below a temperature t which is given by the point of intersection between the curve of the humidity limit $U_{w,limit}$ for heating control and the curve of the humidity limit $U_{w.max}$ for the occurrence of icing and which is about −30° C., the humidity limit of 75%, at which heating is to commence, cannot be reached anymore if the humidity limit is determined based on the WMO definition. This results in premature icing of the sensor assembly.

Therefore, the present invention provides that the humidity limit in temperature range below 0° C. at and above which the humidity sensor is at least temporarily heated by a heating element should not be selected according to the WMO definition, but on the basis of the above-discussed standard definition of relative humidity in accordance with equations 2 and 3. This means that, in accordance with present invention, the humidity limit $U_{i,limit}$ for the heating operation is selected or defined as the limiting humidity with respect to saturation over ice.

In the temperature range below 0° C., the corresponding humidity limit is selected as a constant humidity limit $U_{i,limit}$, preferably in a range 60%≤$U_{i,limit}$≤90%; a suitable humidity limit is, for example, $U_{i,limit}$=75%.

In the temperature range above 0° C., analogously to the procedure in EP 0 801 302 A1, provision is made to heat the humidity sensor at least temporarily by a heating element when the humidity is at or above a predetermined humidity limit $U_{w,limit}$, the humidity limit being selected as the limiting humidity with respect to saturation over water; i.e., in accordance with the relative humidities according to the WMO definition and according to the standard definition, which are identical in this temperature range.

The corresponding relationships in the method according to the present invention are illustrated in the diagrams of FIGS. 4a and 4b, which again show the different humidity limits on the basis of the relative humidities according to the standard definition (FIG. 4a) and according to the WMO definition (FIG. 4b) in the temperature between −100° C. and +60° C.

As can be seen from FIG. 4a, a humidity limit $U_{i,limit}$ in the temperature range below 0° C. is now selected according to the standard definition of relative humidity as $U_{i,limit}$=75%; i.e., as a constant limiting humidity with respect to saturation over ice. When this humidity limit $U_{i,limit}$=75% is reached or exceeded, the humidity sensor is at least temporarily heated by the heating element. For suitable heating methods, reference is made to the following description. As can be seen from FIG. 4a, it is thereby ensured that, unlike in the prior art, the humidity sensor is in any case heated before the humidity limit $U_{i,max}$ at or above which icing occurs is reached, even at very low temperatures t, thereby making it possible to reliably prevent icing of the humidity sensor.

For purposes of comparison, FIG. 4b shows the identical humidity limits $U_{w.max}$, $U_{w,limit}$ as well as $U_w$=100% in the corresponding temperature range, but now on the basis of the humidity definition according to WMO; i.e., analogously to the diagram of FIG. 3. While the conditions above 0° C. are identical to those in the prior art, the humidity limit $U_{w,limit}$ selected in accordance with the present invention on the basis of the standard definition; i.e., in the negative temperature range t<0° C. in the diagram, is always below the humidity limit $U_{w.max}$ for icing. Thus, it is ensured that the heating of the humidity sensor commences prior to the occurrence of icing and that icing of the humidity sensor can be reliably prevented by suitable counter-heating. For a humidity limit $U_{i,limit}$=75% selected according to the standard definition, the corresponding relative humidity according to the WMO definition is then derived as follows:

$$U_w = U_{i,limit} \cdot \frac{e_i(t)}{e_w(t)} = 75 \cdot \frac{e_i(t)}{e_w(t)} \qquad \text{(equation 5)}$$

where:
$U_w$:=relative humidity according to the WMO definition
$U_{i,limit}$=humidity limit for heating according to the standard definition
$e_i(t)$:=saturation water vapor partial pressure over ice at temperature t
$e_w(t)$:=saturation water vapor partial pressure over water at temperature t Thus, a humidity limit $U_{i,limit}$ exists for the heating of the humidity sensor which, according to the standard definition, is constant and selected as $U_{i,limit}$=75%, but which in accordance with the humidity definition according to WMO varies as a function of temperature t in the negative temperature range t<0° C., as illustrated in the lower left portion of FIG. 4b.

In this manner, it is ensured that the humidity sensor virtually never measures a relative humidity higher than 75% according to the standard definition; an icing occurring when the relative humidity according to the standard definition is at or above 100% can thereby be reliably prevented.

It should be noted at this point that the humidity measurement using the humidity sensor according to an embodiment of the present invention is generally still performed in accordance with the WMO definition of relative humidity and that, in accordance with an embodiment of the present invention, a humidity limit $U_{i,limit}$ on the basis of the standard definition is only used for the heating of the humidity sensor.

Before, finally, various exemplary embodiments of inventive sensor assemblies will be described with reference to FIGS. 5-9, suitable ways of heating the sensor assembly are first described below.

A first variant of a suitable heating method using the humidity limit $U_{i,limit}$ selected in accordance with the present invention will be referred to as a static heating method. This method provides that when a first humidity limit $U_{i,limit\_1}$ is exceeded, the humidity sensor is heated with a constant heating power and when the humidity falls below a further, second humidity limit $U_{i,limit\_2}$, the heating is turned off. The two humidity limits $U_{i,limit\_1}$, $U_{i,limit\_2}$ are determined as explained above on the basis of the standard definition of relative humidity; i.e., as limiting humidities with respect to saturation over ice. In a possible embodiment of this heating method, the two humidity limits $U_{i,limit\_1}$, $U_{i,limit\_2}$ between which the humidity sensor is heated with a constant heating power are selected in the following ranges:

$$85\% \leq U_{i,limit\_1} \leq 95\%$$

$$65\% \leq U_{i,limit\_2} \leq 75\%$$

A second variant of a suitable heating method using the humidity limit $U_{i,limit}$ selected in accordance with the present invention will be referred to as a dynamic heating method. In this heating method, when the humidity limit $U_{i,limit}$ is reached or exceeded, the humidity sensor is heated by the heating element in a controlled manner, thereby controlling the temperature of the humidity sensor in such a way that a constant relative humidity is obtained at the humidity sensor. Preferably, control is performed so as to obtain a constant relative humidity as high as the humidity limit $U_{i,limit}$.

In the following, three exemplary embodiments of sensor assemblies suitable for use in the method of the present invention will be described with reference to FIGS. 5a, 5b, 6a, 6b, 7a, 7b. The figures show sectional and plan views of a portion of the respective sensor assemblies. The sensor assemblies also include the electronic control unit.

Each of sensor assemblies according to the present invention includes a humidity sensor, a temperature sensor as well as a heating element. The temperature sensor is used to determine the local temperature of the sensor assembly; the heating element is used to at least temporarily heat the humidity sensor.

A preferred humidity sensor that may be used for the sensor assembly according to the present invention is a capacitive humidity sensor configured on a sensor substrate using thin-film technology. The humidity sensor includes a humidity-sensitive material whose capacitance varies as a function of humidity in a defined way and which is disposed as a dielectric between the two electrodes of a parallel-plate capacitor. One of the two electrodes is permeable to humidity. Particularly suitable humidity-sensitive materials include, in particular, polymers, such as, for example, polyimide.

Preferably, an insulator is used for the sensor substrate in the sensor assembly, the insulator being electrically nonconductive, but having defined thermal properties. Materials suitable for this purpose include, for example, glass, ceramic materials such as $Al_2O_3$, $AlN$ or $Be_2O_3$. Due to its thermal properties, silicon can also be used as the substrate material. In this case, however, an electrically insulating layer must be deposited prior to processing the sensor.

The layers and materials needed to build up the various components of the sensor assembly are successively deposited and patterned on the respective sensor substrate. The respective layers are generally passive and, as insulators, for example, have defined dielectric properties (humidity-sensitive material), or otherwise have defined ohmic properties or soldering properties (metal layers), etc.

In each of the hereinafter described three exemplary embodiments of a sensor assembly according to the present invention, provision is made for the humidity sensor to have a basic configuration of this type. However, it should be noted at this point that generally other variants of humidity sensors are also possible within the scope of the present invention. Other possible embodiments will be outlined at the end of the description.

The various exemplary embodiments of sensor assemblies according to the present invention differ essentially in the configuration and/or position of the temperature sensor and of the heating element on the sensor substrate with the capacitive humidity sensor.

Figure 5A:
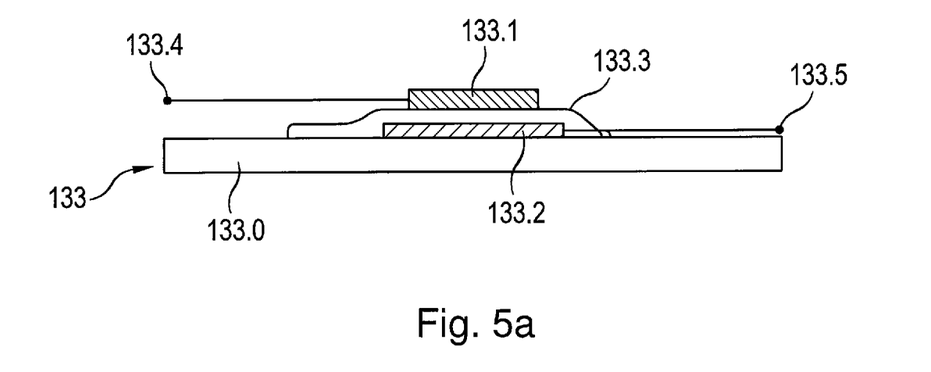
FIG. 5a is a cross-sectional view of a portion of a first exemplary embodiment of a sensor assembly according to the present invention.
Figure 5B:
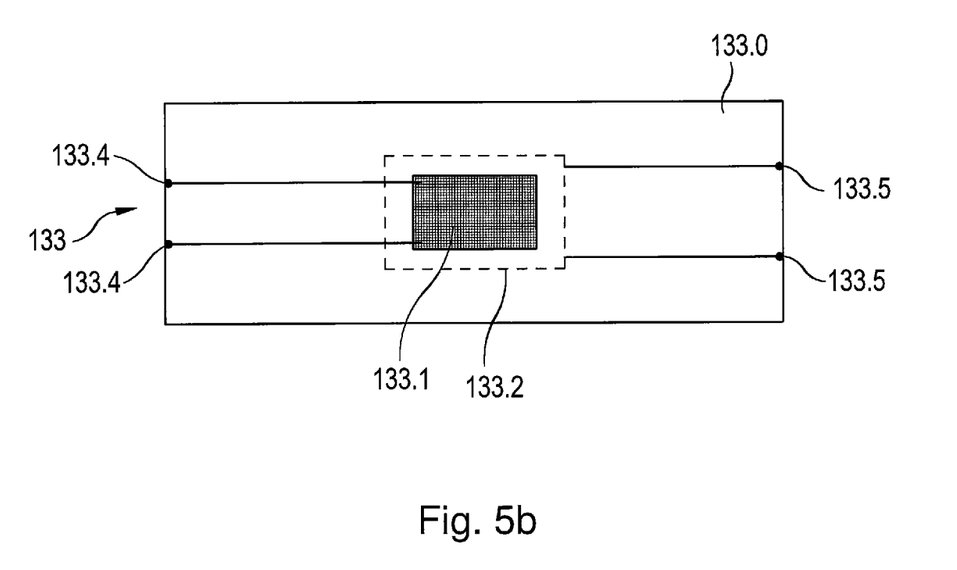
Figure 6A:
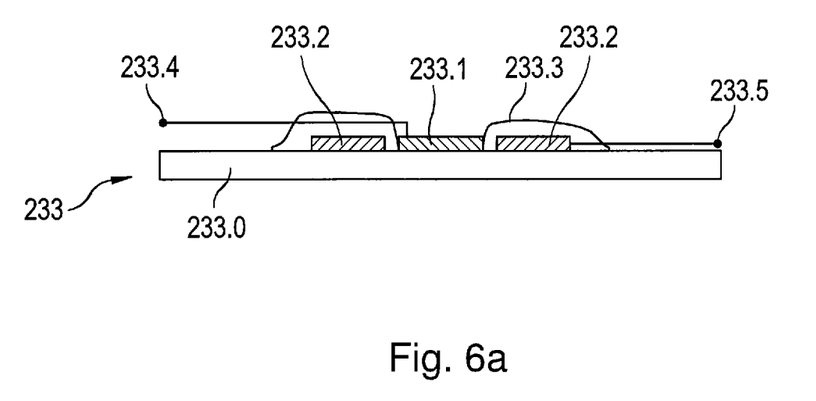
FIG. 6a is a cross-sectional view of a portion of a second exemplary embodiment of a sensor assembly according to the present invention.
Figure 6B:
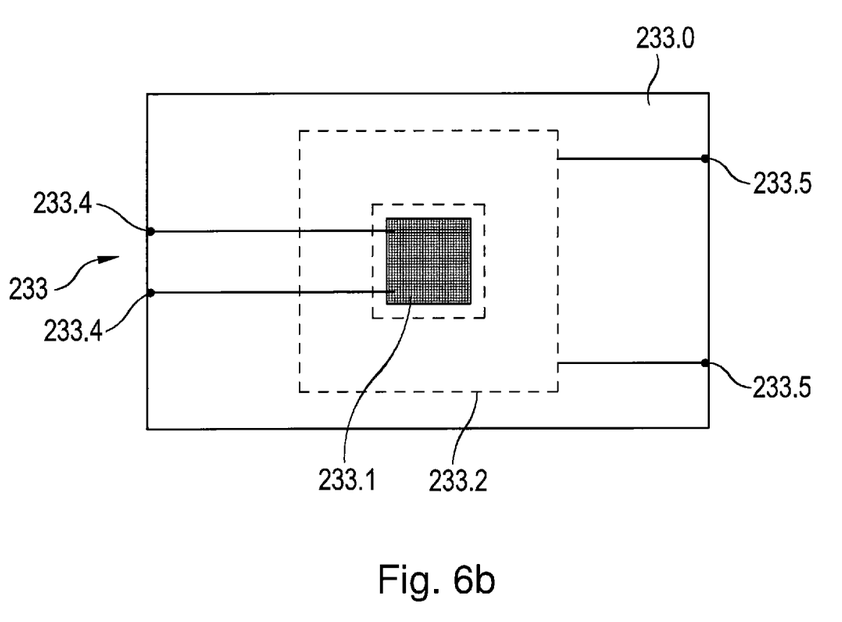
Figure 7A:
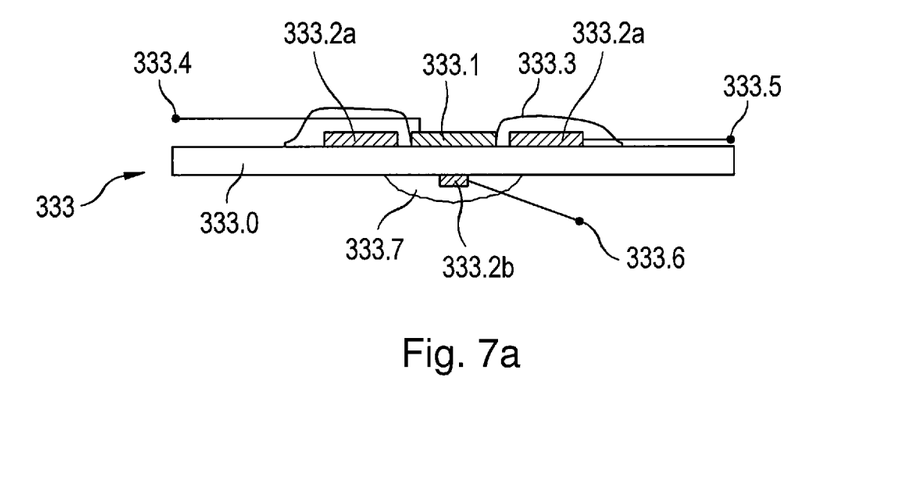
FIG. 7a is a cross-sectional view of a portion of a third exemplary embodiment of a sensor assembly according to the present invention.
Figure 7B:
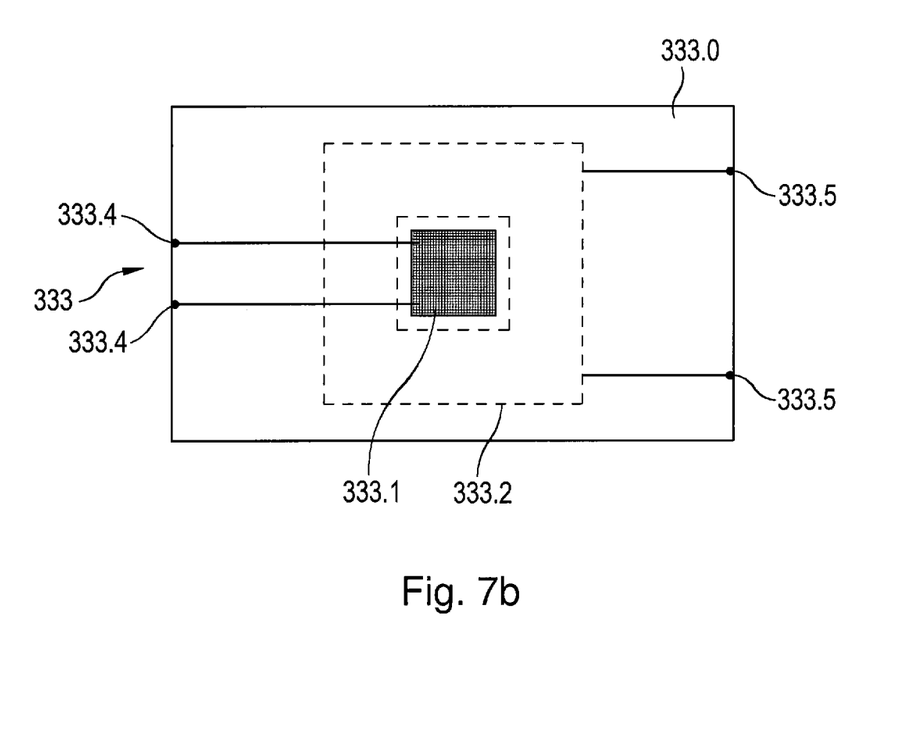

In the sensor assembly variants of FIGS. 5a, 5b and 6a, 6b, for example, the temperature sensor is at the same time used as a heating element, while in the variant according to FIGS. 7a, 7b, the temperature sensor and the heating element are provided as separate components on the sensor substrate. All of the exemplary embodiments described below have in common that the temperature sensor and the heating element are both formed using thin-film technology and made of a material having a defined temperature-dependent resistance characteristic.

In the exemplary embodiment of sensor assembly 133 according to FIGS. 5a, 5b, humidity sensor 133.1 and the combined unit 133.2 including the temperature sensor and the heating element are disposed on the same side of sensor substrate 133.0. More specifically, humidity sensor 133.1 is disposed above the combined unit 133.2 including the temperature sensor and the heating element and separated therefrom by an electrically insulating layer 133.3. Humidity sensor 133.1 is electrically contacted and connected to the control unit via connecting terminals 133.4, and the combined unit 133.2 including the temperature sensor and the heating element is electrically contacted and connected to the control unit via connecting terminals 133.5, the control unit not being shown in this figure.

In the exemplary embodiment of the sensor assembly 233 according to FIGS. 6a, 6b, instead of being superposed upon one another, humidity sensor 233.1 is disposed in the middle or centrally on sensor substrate 233.0, while the combined unit 233.2 including the temperature sensor and the heating element is also disposed on the sensor substrate around humidity sensor 233.1. An electrically insulating layer 233.3 is provided over the combined unit 233.2 including the temperature sensor and the heating element. Humidity sensor 233.1; i.e., its moisture-permeable top electrode, is not covered by the insulating layer. Reference numeral 233.4 denotes the connecting terminals of humidity sensor 233.1, and reference numeral 233.5 denotes those of the combined unit 233.2 including the temperature sensor and the heating element. These components are connected via the aforementioned connecting terminals to the control unit.

In these two exemplary embodiments, the temperature sensor which forms part of the combined unit 133.2, respectively 233.2, including the temperature sensor and the heating element and which serves to measure the local temperature of sensor assembly 133, 233 is at the same time used to heat humidity sensor 133.1, 233.1. To this end, the measurement current flowing through the temperature sensor is selectively varied or increased depending on the required heat output and on the heating method used. The resulting self-heating of the temperature sensor is then used to selectively heat humidity sensor 133.1, 233.1 in order to prevent icing.

Figure 8:
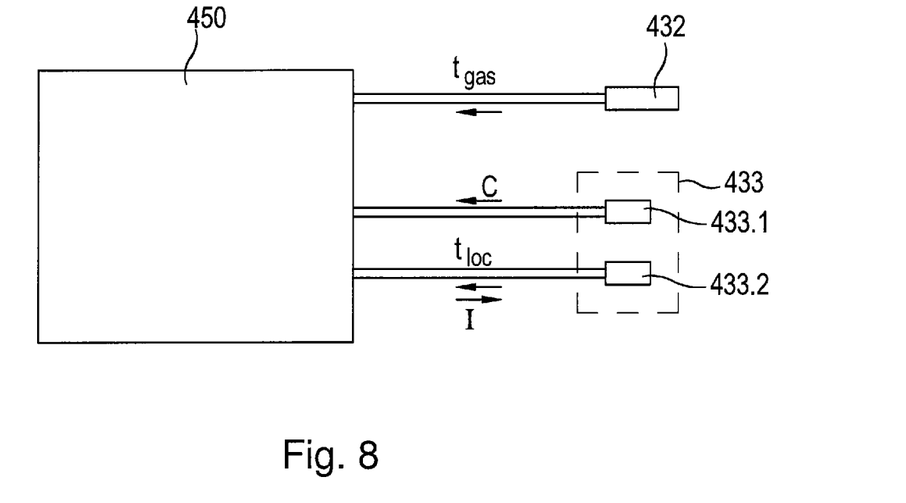
FIG. 8 is a schematic block diagram showing a further embodiment of the sensor assembly in conjunction with the control unit.

According to FIG. 8, sensor assemblies 433 configured in this manner may be connected to a downstream control unit 450 in the radiosonde. Here, measurement values C of humidity sensor 433.1 are transmitted to control unit 450. The combined unit 433.2 including the temperature sensor and the heating element transmits the measurement values $t_{loc}$ regarding the local temperature of sensor assembly 433 to the control unit, and the control unit acts upon the combined unit 433.2 including the temperature sensor and the heating element via measurement current I to provide heating as required. For this purpose, the two above-described heating methods (static, dynamic) can be used. In the case of a static heating method, the heating is turned on and off by switching measurement current I between measurement currents of different magnitude. When using a dynamic heating method, measurement current I is varied in a defined manner, thereby controlling the heat output and thus the local sensor humidity via temperature $t_{loc}$.

Also shown in FIG. 8 is gas temperature sensor 432 of the sensor unit of the radiosonde. Gas temperature sensor 432 serves to measure ambient air temperature $t_{gas}$, but is otherwise irrelevant to the present invention.

A third exemplary embodiment of a sensor assembly 333 is shown in FIGS. 7a and 7b. Here, temperature sensor 333.2b and heating element 333.2a are disposed as separate components on sensor substrate 333.0, namely on different sides thereof. On the top side of sensor substrate 333.0, heating element 333.2a is arranged adjacent to the centrally disposed humidity sensor 333.1. Again, heating element 333.2a is covered by an insulating layer 333.3, but the region of capacitive humidity sensor 333.1, in particular its moisture-permeable top electrode, remains freely accessible. Temperature sensor 333.2b is disposed centrally on the bottom side of sensor substrate 333.0. Temperature sensor 333.2b is here in the form of an NTC element (Negative Temperature Coefficient Thermistor) which is secured to the bottom side of sensor substrate 333.0 by thermally conductive adhesive 333.7. In this exemplary embodiment, in addition to connecting terminals 333.4 for humidity sensor 333.1, separate connecting terminals 333.5, 333.6 are provided for heating element 333.2a and temperature sensor 333.2b. Again, the various components are connected to the downstream control unit via these connecting terminals 333.4, 333.5, 333.5.

Figure 9:
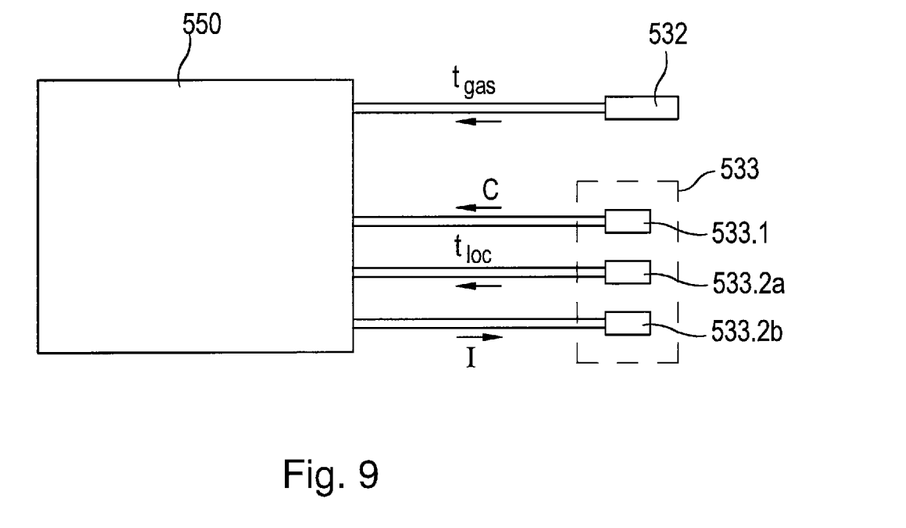
FIG. 9 is a schematic block diagram showing a further embodiment of the sensor assembly in conjunction with the control unit

According to FIG. 9, sensor assemblies 533 configured in this manner may be connected to a downstream control unit 550 in the radiosonde. Here, too, measurement values C of humidity sensor 533.1 are transmitted to control unit 550. Moreover, provision is made for transmitting to control unit 550 the measurement values $t_{loc}$ of temperature sensor 533.2a regarding the local temperature of sensor assembly 433. Furthermore, control unit 550 acts upon heating element 533.2b via measurement current I to provide heating as required. Here, too, the two above-described heating methods (static, dynamic) can be used. When using a static heating method, the heating is turned on and off by switching heating current I between heating currents of different magnitude. When using a dynamic heating method, heating current I is varied in a defined manner, thereby controlling the heat output and thus the local sensor humidity via temperature $t_{loc}$.

Also shown in FIG. 9 is gas temperature sensor 532 of the sensor unit of the radiosonde. Gas temperature sensor 532 serves to measure ambient air temperature $t_{gas}$, but is otherwise irrelevant to the present invention.

In addition to the exemplary embodiments described above, other embodiments are of course possible within the scope of the present invention.

For example, it is possible to use other variants of capacitive humidity sensors. Moreover, so-called "stray field capacitors" having interdigitated structures or mesa structures may be used instead of parallel-plate capacitor designs. It would also be conceivable to use resistive humidity sensors.

As explained above, if silicon is used as the material for the sensor substrate, the temperature sensor and the heating element can be formed in silicon using thin-film technology. Then, the humidity sensor is processed onto the sensor substrate using thin-film technology. In this case, moreover, it is convenient to integrate signal-processing circuits and/or the control unit into the sensor substrate.

Moreover, the elements of the sensor assembly could be disposed on a sensor substrate in the form of a thin diaphragm, which would make it possible to reduce the required heat output and thereby achieve significantly shorter time constants during measurement.

Furthermore, the embodiment shown in FIGS. 7a, 7b could be modified such that a temperature sensor is processed onto the bottom side of the sensor substrate, etc While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a sensor assembly for determining relative humidity in radiosondes, the sensor assembly including a humidity sensor, a temperature sensor and a heating element, the method comprising:
- determining whether humidity is at or above a predetermined humidity limit selected as a limiting humidity with respect to saturation over ice; and
- heating the humidity sensor, at least temporarily, wherein in a temperature range below 0° C., the humidity sensor is at least temporarily heated by the heating element based on a determination that the humidity is at or above the predetermined humidity limit,
- wherein, in the temperature range below 0° C., the predetermined humidity limit is selected according to the standard definition of relative humidity as a constant humidity limit, the relative humidity is derived as:

$$U_i = \frac{e}{e_i(t)} \cdot 100 = U_w \cdot \frac{e_w(t)}{e_i(t)}$$

where:
$U_i$:=relative humidity according to the standard definition over ice,
e:=actual water vapor partial pressure,
$e_i(t)$:=water vapor partial pressure at saturation over an ice surface,
$U_w$:=relative humidity according to the World Meteorological Organization (WMO) definition over water, and
$e_w(t)$:=water vapor partial pressure at saturation over a water surface.

2. The method as recited in claim 1, wherein the predetermined humidity limit is selected in a range from 60% to 90%.

3. The method as recited in claim 2, wherein the humidity limit is selected as 75%.

4. The method as recited in claim 1, wherein in a predetermined range between a first humidity limit and a second humidity limit, the humidity sensor is heated by the heating element with a constant heating power, the humidity limits being selected as limiting humidities with respect to saturation over ice.

5. The method as recited in claim 4, wherein the first humidity limit is selected in a range from 85% to 95%, and the second humidity limit is selected in a range from 65% to 75%.

6. The method as recited in claim 1, wherein when the humidity limit is reached or exceeded, the humidity sensor is heated by the heating element in a controlled manner so as to result in a constant relative humidity of the humidity sensor.

7. The method as recited in claim 6, wherein a local temperature of the humidity sensor is controlled so as to obtain a constant relative humidity as high as the humidity limit.

8. The method as recited in claim 1, wherein in a temperature range above 0° C., the humidity sensor is at least temporarily heated by the heating element based on a determination that the humidity is at or above a predetermined humidity limit selected as the limiting humidity with respect to saturation over water.

9. A sensor assembly for determining relative humidity in radiosondes, the sensor assembly including comprising:
- a humidity sensor;
- a temperature sensor;
- a heating element; and
- a control unit configured to cause the heating element to heat the humidity sensor, at least temporarily, wherein, in a temperature range below 0° C., the control unit is configured to at least temporarily cause the heating element to heat the humidity sensor based on a determination that humidity is at or above a predetermined humidity limit selected as a limiting humidity with respect to saturation over ice, and wherein, in the temperature range below 0° C., the predetermined humidity limit is selected according to the standard definition of relative humidity as a constant humidity limit, the relative humidity is derived as:

$$U_i = \frac{e}{e_i(t)} \cdot 100 = U_w \cdot \frac{e_w(t)}{e_i(t)}$$

where:
$U_i$:=relative humidity according to the standard definition over ice,
e:=actual water vapor partial pressure,
$e_i(t)$:=water vapor partial pressure at saturation over an ice surface,
$U_w$:=relative humidity according to the World Meteorological Organization (WMO) definition over water, and
$e_w(t)$:=water vapor partial pressure at saturation over a water surface.

10. The sensor assembly as recited in claim 9, wherein the humidity sensor is configured as a parallel-plate capacitor including two electrodes and a humidity-sensitive polymer disposed between the two electrodes, one of the electrodes being permeable to humidity.

11. The sensor assembly as recited in claim 9, wherein the temperature sensor and the heating element are configured as a combined unit, and wherein the control unit is configured to cause a measurement current to be varied for purposes of heating the humidity sensor.

12. The sensor assembly as recited in claim 11, wherein the humidity sensor is disposed on one side of a sensor substrate and the combined unit including the temperature sensor and the heating element is disposed adjacent thereto.

13. The sensor assembly as recited in claim 10, wherein the humidity sensor is disposed on one side of a sensor substrate and the heating element is disposed adjacent thereto, and wherein the temperature sensor is disposed on an opposite side of the sensor substrate, the temperature sensor being configured as a negative temperature coefficient (NTC) element and attached to the sensor substrate by a thermally conductive adhesive.

14. The sensor assembly as recited in claim 9, wherein the humidity sensor, the temperature sensor and the heating element were deposited on a sensor substrate of silicon using thin-film technology, the sensor substrate having an insulation layer.

* * * * *